United States Patent
Lu et al.

(10) Patent No.: US 12,096,457 B2
(45) Date of Patent: Sep. 17, 2024

(54) METHOD AND DEVICE FOR INDICATING PDCCH RESOURCES

(71) Applicant: GUANGDONG OPPO MOBILE TELECOMMUNICATIONS CORP., LTD., Guangdong (CN)

(72) Inventors: Qianxi Lu, Guangdong (CN); Jing Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 619 days.

(21) Appl. No.: 17/181,543

(22) Filed: Feb. 22, 2021

(65) Prior Publication Data

US 2021/0176732 A1    Jun. 10, 2021

Related U.S. Application Data

(63) Continuation of application No. PCT/CN2019/093859, filed on Jun. 28, 2019.

(60) Provisional application No. 62/722,815, filed on Aug. 24, 2018.

(51) Int. Cl.
*H04W 72/30* (2023.01)
*H04W 72/0446* (2023.01)
*H04W 72/23* (2023.01)

(52) U.S. Cl.
CPC ....... *H04W 72/30* (2023.01); *H04W 72/0446* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2010/0329171 A1* | 12/2010 | Kuo | H04W 72/30 370/312 |
| 2013/0114419 A1 | 5/2013 | Chen et al. | |
| 2014/0241232 A1 | 8/2014 | Damji et al. | |
| 2015/0098384 A1 | 4/2015 | Deng et al. | |

(Continued)

FOREIGN PATENT DOCUMENTS

| | | |
|---|---|---|
| CN | 101998273 A | 3/2011 |
| CN | 102036171 A | 4/2011 |

(Continued)

OTHER PUBLICATIONS

Chinese First Office Action with English Translation for CN Application 202110529934.4, mailed Aug. 1, 2022. (15 pages).

(Continued)

*Primary Examiner* — Jeffrey M Rutkowski
*Assistant Examiner* — Luna Weissberger
(74) *Attorney, Agent, or Firm* — Young Basile Hanlon & MacFarlane, P.C.

(57) ABSTRACT

Methods and devices for indicating PDCCH resources are provided. The method includes: a network device generates an instruction for PDCCH resources for subframes; the network device sends the instruction for PDCCH resources; a terminal device receives the instruction for PDCCH resources for subframes; the terminal device determines a number of symbols for PDCCH for a MBSFN subframe based on the first instruction and a number of symbols for PDCCH for a non-MBSFN subframe based on the list of indications in the second instruction.

12 Claims, 3 Drawing Sheets

(56) References Cited

U.S. PATENT DOCUMENTS

2016/0338018 A1    11/2016  Awad et al.
2018/0131430 A1*    5/2018  Gao ..................... H04L 5/0044
2018/0324797 A1*   11/2018  Hosseini ............... H04L 5/0057

FOREIGN PATENT DOCUMENTS

| CN | 103703706 A | 4/2014 | |
|----|-------------|--------|---|
| CN | 108352916 A | 7/2018 | |
| EP | 2378675 A2 | 10/2011 | |
| EP | 2905915 A1 | 8/2015 | |
| WO | 2010110584 A2 | 9/2010 | |
| WO | WO-2011018000 A1 * | 2/2011 | ............. H04L 5/001 |

OTHER PUBLICATIONS

International Search Report for PCT/CN2019/093859 dated Oct. 10, 2019.
Extended European Search Report for EP Application 19851067.9 mailed Aug. 20, 2021. (8 pages).

* cited by examiner

METHOD AND DEVICE FOR INDICATING PDCCH RESOURCES

CROSS-REFERENCE TO RELATED APPLICATION(S)

The present application is a continuation application of International Application No. PCT/CN2019/093859, filed on Jun. 28, 2019, which claims priority to US provisional application No. 62/722,815, filed on Aug. 24, 2018. The present application claims priority and the benefit of the above-identified applications and the above-identified applications are incorporated by reference herein in their entireties.

TECHNICAL FIELD

The present disclosure relates to the field of communications, and especially relates to the method and device for indicating PDCCH resources.

BACKGROUND

In LTE, the PCFICH (Physical Control Format Indicator Channel) was used by a network side device such as eNodeB to indicate the PDCCH (Physical Downlink Control Channel) resource, i.e., how many symbols are used for PDCCH, for each subframe to terminal devices such as UE (User Equipment).

Recently, instead of PCFICH, RRC signalling is used to indicate the PDCCH resource. However, such indication needs to distinguish MBSFN subframe from non-MBSFN subframe, and PDCCH load for different subfames may be different due to asymmetric uplink and downlink resource in TDD (Time Division Duplex) system. There is not a suitable way to indicate the PDCCH resources in the art.

SUMMARY

The present disclosure provides methods and devices for indicating PDCCH resources, which can provide the indication in consideration of both the differentiation between MBSFN and non-MBSFN subframe, and the PDCCH loads for different subframes.

In a first aspect, a method for indicating PDCCH resources is provided. The method includes: receiving, by a terminal device, an instruction for PDCCH (Physical Downlink Control Channel) resources for subframes; wherein the instruction includes a first instruction for PDCCH resources for MBSFN (Multicast Broadcast Single Frequency Network) subframes and a second instruction including a list of indications for PDCCH resources for non-MB SFN subframes; and determining, by the terminal device, a number of symbols for PDCCH for a MBSFN subframe based on the first instruction and a number of symbols for PDCCH for a non-MBSFN subframe based on the list of indications in the second instruction.

In a second aspect, a terminal device is provided. The terminal device includes: a receiving module, used for receiving an instruction for PDCCH resources for subframes; wherein the instruction comprises a first instruction for PDCCH resources for MBSFN subframes and a second instruction comprising a list of indications for PDCCH resources for non-MBSFN subframes; and a determining module, used for determining a number of symbols for PDCCH for a MBSFN subframe based on the first instruction and a number of symbols for PDCCH for a non-MBSFN subframe based on the list of indications in the second instruction.

In a third aspect, a method for indicating PDCCH resources is provided. The method includes: generating, by a network device, an instruction for PDCCH (Physical Downlink Control Channel) resources for subframes; wherein the instruction includes a first instruction for PDCCH resources for MBSFN (Multicast Broadcast Single Frequency Network) subframes and a second instruction including a list of indications for PDCCH resources for non-MBSFN subframes; and sending, by the network device, the instruction for PDCCH resources.

In a fourth aspect, a network side device is provided. The network side device includes: a generating module, used for generating an instruction for PDCCH (Physical Downlink Control Channel) resources for subframes; wherein the instruction includes a first instruction for PDCCH resources for MBSFN (Multicast Broadcast Single Frequency Network) subframes and a second instruction including a list of indications for PDCCH resources for non-MBSFN subframes; and a sending module, used for sending the instruction for PDCCH resources.

In a fifth aspect, a terminal device is provided. The terminal device includes: a processor and a memory, wherein a computer program is stored in the memory, and when the computer program is executed by the processor, the processor performs actions of: receiving an instruction for PDCCH resources for subframes; wherein the instruction includes a first instruction for PDCCH resources for MBSFN subframes and a second instruction including a list of indications for PDCCH resources for non-MBSFN subframes; and determining a number of symbols for PDCCH for a MBSFN subframe based on the first instruction and a number of symbols for PDCCH for a non-MBSFN subframe based on the list of indications in the second instruction.

In a sixth aspect, a network side device is provided. The network device includes a processor and a memory, wherein a computer program is stored in the memory, and when the computer program is executed by the processor, the processor performs actions of: generating an instruction for PDCCH resources for subframes; wherein the instruction includes a first instruction for PDCCH resources for MBSFN subframes and a second instruction including a list of indications for PDCCH resources for non-MB SFN subframes; and sending the instruction for PDCCH resources.

In a seventh aspect, a non-transitory computer-readable storage medium is provided. The non-transitory computer-readable storage medium includes a computer program which, when being executed by a computer, enables the computer to execute the method in the first aspect.

In an eighth aspect, a non-transitory computer-readable storage medium is provided. The non-transitory computer-readable storage medium includes a computer program which, when being executed by a computer, enables the computer to execute the method in the third aspect.

According to the implementations of the present disclosure, the PDCCH resources are indicated by a first instruction for PDCCH resources for MBSFN subframes and a second instruction including a list of indications for PDCCH resources for non-MBSFN subframes. Therefore, the PDCCH resources could be indicated for MBSFN subframes and non-MBSFN subframes separately, and could be indicated flexibly for different non-MB SFN subframes based on the list of indications, so as to meet the requirement on the indication in consideration of both the differentiation between MBSFN and non-MBSFN subframe, and the PDCCH loads for different subframes.

DETAILED DESCRIPTION

The technical solutions in the implementations of the present disclosure will be described clearly and completely in the following with reference to the drawings in the implementations of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a long term evolution (LTE) system, a LTE Frequency Division Duplex (FDD) system, a LTE Time Division Duplex (TDD) system, a Universal Mobile Telecommunication System (UMTS) or a Worldwide Interoperability for Microwave Access (WiMAX) communication system, a 5G system, or a new radio (NR) system.

In implementations of the present disclosure, the terms "network" and "system" are often used interchangeably, but those skilled in the art can understand their meaning. The terminal device involved in the implementations of the present disclosure may include various handheld devices with wireless communication functions, vehicle-mounted devices, wearable devices, computing devices or other processing devices connected to wireless modems, as well as various forms of user equipment (UE), mobile stations (MS), or mobile terminals, etc. For convenience of description, in implementations of the present disclosure, the above-mentioned devices are collectively referred to as terminal device. In the implementations of the present disclosure, applications are installed on the terminal device.

In implementations of the present disclosure, a network side device may be a device, such as base station, eNode-B, and so on, for communicating with the terminal device, and may be a core network control plane entity such as SMF (Session Management Function), PGW-C (Packet Data Network Gateway-Control Plane), and may also be a core network user plane entity such as UPF (User Plane Function), PGW-U (Packet Data Network Gateway-User Plane), an OTT (Over The Top) server, and may also be a network side device in a future 5G network, or a network side device in a future evolved public land mobile network (PLMN), etc. Also, the network side device may be a single device or combination of a plurality of devices. For example, one network side device detects the data packets of traffic and determines the application to which the traffic belongs, that is, the traffic is generated by the application, but another network side device plays the role of configuring the terminal device with related information.

Figure 1:
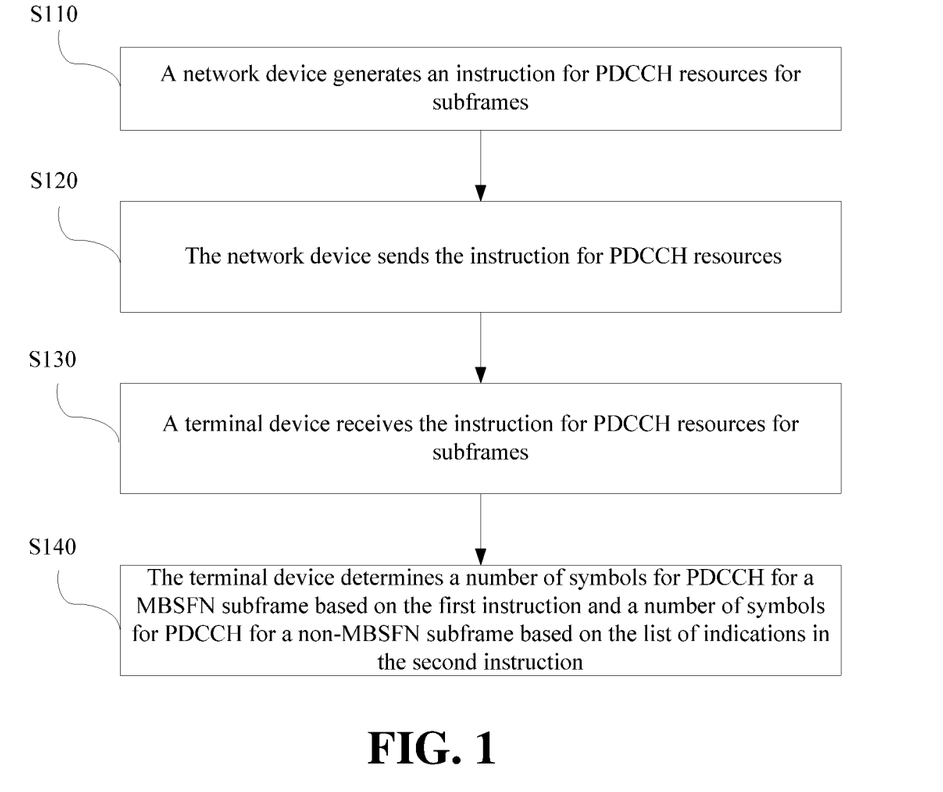
FIG. 1 is a schematic flowchart of a method for indicating PDCCH resources according to an implementation of the present disclosure.

FIG. 1 is a schematic flowchart of a method for indicating PDCCH resources according to an implementation of the present disclosure. As shown in FIG. 1, the method 100 includes S110 to S140.

In S110, a network device generates an instruction for PDCCH resources for subframes. Herein the instruction includes a first instruction for PDCCH resources for MBSFN (Multicast Broadcast Single Frequency Network) subframes and a second instruction including a list of indications for PDCCH resources for non-MBSFN subframes.

In S120, the network device sends the instruction for PDCCH resources.

In S130, a terminal device receives the instruction for PDCCH resources for subframes. As disclosed in S110, the instruction includes a first instruction for PDCCH resources for MBSFN subframes and a second instruction including a list of indications for PDCCH resources for non-MBSFN subframes.

In S140, the terminal device determines a number of symbols for PDCCH for a MBSFN subframe based on the first instruction and a number of symbols for PDCCH for a non-MBSFN subframe based on the list of indications in the second instruction.

By the method, the PDCCH resources for MBSFN subframes are indicated separately from the PDCCH resources for non-MBSFN subframes. Since there is a list of indications for PDCCH resources for non-MBSFN subframes, different non-MBSFN subframes may have different indications for PDCCH resources, so the indication is flexibly and could then meet the requirement that PDCCH load for different subfames may be different.

In an implementation, the first instruction includes a single indication of the number of symbols for PDCCH. In this way, the network side device determines a same number of symbols for PDCCH for different MBSFN subframes. Accordingly, the terminal device determines a same number of symbols for PDCCH for different MBSFN subframes. For example, all the MBSFN subframes may have the same number of symbols for PDCCH.

In another implementation, the first instruction includes another list of indications of the number of symbols for PDCCH. Such another list of indications is used for MBSFN subframes, and could be different from the list of indications for non-MBSFN subframes. In this way, the network side device could send a relationship between position of the MBSFN subframe and the indication in the another list of indications in the first instruction to a terminal device. Herein, the position of the MBSFN subframe refers to the location of the MBSFN subframe in a frame, a SFN (system frame number) or a subframe number of the MBSFN subframe. Accordingly, the terminal device receives the relationship and determines corresponding indication in the another list of indications based on a relationship between position of the MBSFN subframe and the indication in the another list of indications, and determining the number of symbols for PDCCH for the MBSFN subframe according to the corresponding indication.

Alternatively, in the case that the first instruction includes another list of indications of the number of symbols for PDCCH, the network side device could also send a rule to use the another list of indications in the first instruction in sequence to the terminal device. Accordingly, the terminal device could receive the relationship, and uses the another list of indications in the first instruction in sequence to determine the number of symbols for PDCCH for the MBSFN subframe. For example, the terminal device could record the last used indication, and uses the next indication to determine the number of symbols for PDCCH for the next MBSFN subframe. Alternatively, the rule may be predetermined and preconfigured on the terminal device, so that there is no need to send the rules by the network side device. There may be other rules, which is not limited here.

In an implementation, similarly to the another list of indications in the first instruction, for the list of indications in the second instruction, the network side device could send the rule to use the list of indications in the second instruction in sequence to the terminal device, or the network side device could send a relationship between position of the non-MBSFN subframe and the indication in the list of indications in the second instruction to the terminal device. Herein, the position of the non-MBSFN subframe refers to the location of the non-MBSFN subframe in a frame, a SFN (system frame number), or a subframe number of the non-MBSFN subframe.

In an implementation, a number of indications in the list of indications in the second instruction is same as a period of the MBSFN subframe.

In an implementation, a number of indications in the list of indications in the second instruction is not same as the period of the MBSFN subframe.

Two examples are provided to show the instruction of PDCCH resources.

Example I

In this example, the first instruction for MBSFN subframe includes a single indication and the second instruction for the non-MBSFN subframe includes a list of indications.

In this example, the list of indications includes 10 indications, such as expressed by (X1, X2, . . . , X10). Each component in the list indicates the number of PDCCH symbols. In an example, the value of each component is an integer. The value of each component is not limited here.

The list could repeat periodically, i.e., the PDCCH resource for the non-MBSFN subframe would be symbols whose number is in a way like: X1, X2, . . . , X10, X1, X2, . . . , X10, X1, X2, . . . , X10, . . . .

Herein, the length of the indication list may equal to the period of MBSFN subframe, or not equal to the period of MBSFN subframe. For example, the period of MBSFN subframe can range from 10 ms to 320 ms. The length of the indication list could be determined as 320 ms, or another value.

In this example, a single indication is used to indicate the PDCCH resource allocation for all the MBSFN subframes. That is, all the MBSFN subframes have the same number of symbols for PDCCH. For example, the single indication is a number named A.

In a whole, the PDCCH resource for the subframes would be symbols whose number is in a way like: X1, X2, . . . , X10, A, X1, X2, . . . , A, X1, X2, . . . , X10, . . . .

Example II

In this example, the first instruction for MBSFN subframe includes a list of indications and the second instruction for the non-MBSFN subframe also includes a list of indications. To distinguish the two lists, the list of indications for the MBSFN subframe is named the another list of indications.

In this example, the another list of indications could be mapped to the subframes based on the SFN number or subframe number, or just the location of the subframe in a frame. Similar to the list of indications for the non-MBSFN subframe, each component indicates the number of symbols for PDCCH for the MBSFN subframe, and the list of indications could be repeated periodically. Herein, the another list of indications could have 6 indications expressed by (Y1, Y2, . . . , Y6), and the list (Y1, Y2, . . . , Y6) could be mapped to subframes (or DL subframes) continuously.

For example, for a subframe Z, if it is MBSFN subframe, the SFN and/or subframe position may be checked, and the corresponding component may be determined from Y1-Y6 to determine the number of symbols for PDCCH. Otherwise, the X1-X10 list for the non-MBSFN subframe is used.

Alternatively, the list of indications for MBSFN subframes could be used to indicate the number of symbols for PDCCH based on the appearance of MBSFN subframe within the list of indications for non-PDCCH subframes. For example, if the first MBSFN subframe appears next to X2, then the Y3 is used to indicate the number of symbols for the first MBSFN subframe. Later, the indications are used in sequence.

By the method for indicating PDCCH resources listed above, the PDCCH resources for MBSFN subframes are indicated separately from the PDCCH resources for non-MBSFN subframes. Since there is a list of indications for PDCCH resources for non-MBSFN subframes, different non-MBSFN subframes may have different indications for PDCCH resources, so the indication is flexibly and could then meet the requirement that PDCCH load for different subfames may be different. Since there may also be a list of indications for PDCCH resources for MBSFN subframes, the indication of symbols for PDCCH for MBSFN subframes could also be flexible, so that improve the indication of the symbols for PDCCH.

The method for indicating PDCCH resources according to the implementation of the present disclosure has been described in detail above in conjunction with FIG. 1. Based on the same one inventive concept as the above stated methods, the terminal device according to an implementation of the present disclosure will be described in detail below in conjunction with FIG. 2. The details performed by the terminal device above could also be performed by the following corresponding modules of the terminal device, and some descriptions are omitted as appropriate in order to avoid duplication.

Figure 2:
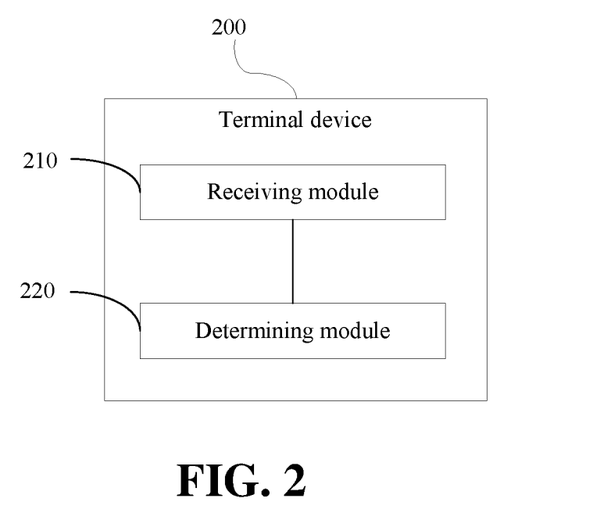
FIG. 2 is a block diagram of the terminal device according to an implementation of the present disclosure.

FIG. 2 is a block diagram of the terminal device according to an implementation of the present disclosure. As shown in FIG. 2, the terminal device 200 includes a receiving module 210 and a determining module 220.

The receiving module 210 is used for receiving an instruction for PDCCH resources for subframes. Herein the instruction includes a first instruction for PDCCH resources for MBSFN subframes and a second instruction including a list of indications for PDCCH resources for non-MBSFN subframes.

The determining module 220 is used for determining a number of symbols for PDCCH for a MBSFN subframe based on the first instruction and a number of symbols for PDCCH for a non-MBSFN subframe based on the list of indications in the second instruction.

In an implementation, the first instruction includes a single indication of the number of symbols for PDCCH. At the moment, the determining module 220 is used for: determining a same number of symbols for PDCCH for different MBSFN subframes.

In an implementation, the first instruction includes another list of indications of the number of symbols for PDCCH. At the moment, the determining module 220 is used for: determining corresponding indication in the another list of indications based on a relationship between position of the MBSFN subframe and the indication in the another list of indications, and determining the number of symbols for PDCCH for the MBSFN subframe according to the corresponding indication. Herein, the position of the MBSFN subframe refers to the position of the MBSFN subframe in a frame, a SFN (system frame number) or a subframe number of the MBSFN subframe. Alternatively, the determining module 220 is used for: using the another list of indications in the first instruction in sequence to determine the number of symbols for PDCCH for the MBSFN subframe.

In an implementation, the determining module 220 is used for: using the list of indications in the second instruction in sequence to determine the number of symbols for PDCCH for the non-MB SFN subframe. Alternatively, the determining module 220 is used for: determining a corresponding indication in the list of indications based on a relationship between the position of the non-MBSFN subframe and the indication in the list of indications in the second instruction, and determining the number of symbols for PDCCH for the non-MBSFN subframe according to the corresponding indication. Herein, the position of the non-MBSFN subframe refers to the location of the non-MBSFN subframe in a frame, a SFN, or a subframe number of the non-MBSFN subframe.

Herein, the number of indications in the list of indications in the second instruction is same as the period of the MBSFN subframe. Alternatively, the number of indications in the list of indications in the second instruction is not same as the period of the MBSFN subframe.

By the terminal device according to the implementation of the present disclosure, the PDCCH resources for MBSFN subframes are indicated separately from the PDCCH resources for non-MBSFN subframes. Since there is a list of indications for PDCCH resources for non-MBSFN subframes, different non-MBSFN subframes may have different indications for PDCCH resources, so the indication is flexibly and could then meet the requirement that PDCCH load for different subfames may be different.

Figure 3:
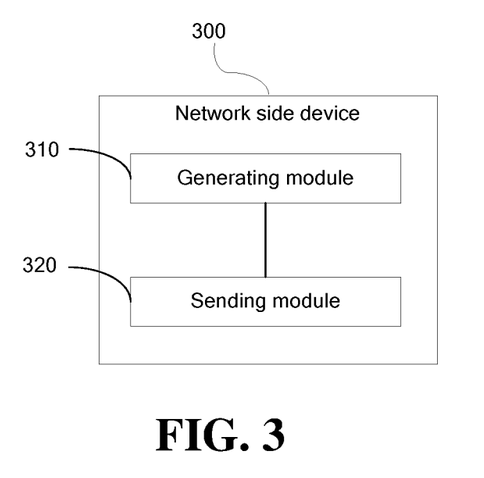
FIG. 3 is a block diagram of the network side device according to an implementation of the present disclosure.

Based on the same one inventive concept as the above stated methods, the network side device according to an implementation of the present disclosure will be described in detail below in conjunction with FIG. 3. FIG. 3 is a block diagram of a network side device according to an implementation of the present disclosure. The details performed by the network side device above could also be performed by the following corresponding modules of the network side device, and some descriptions are omitted as appropriate in order to avoid duplication.

As shown in FIG. 3, the network side device 300 includes a generating module 310 and a sending module 320.

The generating module 310 is used for generating an instruction for PDCCH resources for subframes; wherein the instruction includes a first instruction for PDCCH resources for MBSFN subframes and a second instruction including a list of indications for PDCCH resources for non-MBSFN subframes.

The sending module 320 is used for sending the instruction for PDCCH resources.

In an implementation, the first instruction includes a single indication of the number of symbols for PDCCH. At the moment, the generating module 310 is used for: generating the single indication of the number of symbols for PDCCH for MBSFN subframes to indicate that different MBSFN subframes have same number of symbols for PDCCH.

In an implementation, the first instruction includes another list of indications of the number of symbols for PDCCH. At the moment, the sending module 320 is used for: sending a relationship between position of the MBSFN subframe and the indication in the another list of indications in the first instruction to a terminal device. Herein, the position of the MBSFN subframe refers to the location of the MBSFN subframe in a frame, a SFN (system frame number) or a subframe number of the MBSFN subframe. Alternatively, the sending module 320 is used for: sending a rule to use the another list of indications in the first instruction in sequence to the terminal device.

In an implementation, the sending module 320 is used for: sending another rule to use the list of indications in the second instruction in sequence to the terminal device. Alternatively, the sending module 320 is used for: sending a relationship between position of the non-MBSFN subframe and the indication in the list of indications in the second instruction to the terminal device. Herein, the position of the non-MBSFN subframe refers to the location of the non-MBSFN subframe in a frame, a SFN (system frame number), or a subframe number of the non-MBSFN subframe.

In an implementation, the number of indications in the list of indications in the second instruction is same as a period of the MBSFN subframe. Alternatively, the number of indications in the list of indications in the second instruction is not same as the period of the MBSFN subframe.

By the network side device according to the implementation of the present disclosure, the PDCCH resources for MBSFN subframes are indicated separately from the PDCCH resources for non-MBSFN subframes. Since there is a list of indications for PDCCH resources for non-MBSFN subframes, different non-MBSFN subframes may have different indications for PDCCH resources, so the indication is flexibly and could then meet the requirement that PDCCH load for different subfames may be different.

Figure 4:
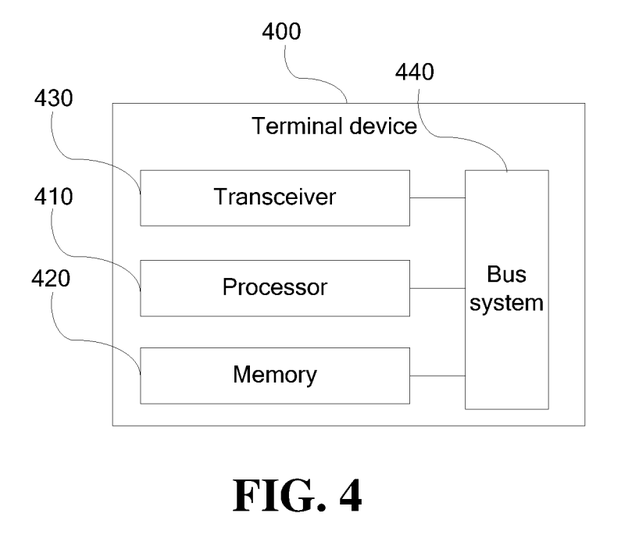
FIG. 4 is a block diagram of the terminal device according to yet another implementation of the present disclosure.

FIG. 4 is the terminal device according to yet another implementation of the present disclosure. As shown in FIG. 4, the terminal device 400 includes a processor 410 and memory 420. Optionally, the terminal device 400 may further include a transceiver 430, and a bus system 440. The processor 410, the memory 420 and the transceiver 430 may be connected through the bus system 440. The memory 420 may be used for storing computer programs, and the processor 410 is used for executing the computer programs stored in the memory 420 to control the transceiver 430 to send or receive information. It should be understood that all the actions listed in the method in combination with FIG. 1 and the actions performed by the modules in the terminal device 20 recited above in combination with FIG. 2 may be performed by the processor 410 under the indication of programs in the terminal device 400, and some detailed descriptions are omitted as appropriate in order to avoid duplication.

Specifically, when the computer programs are performed by the processor 410, the processor 410 is used for receiving an instruction for PDCCH (Physical Downlink Control Channel) resources for subframes; wherein the instruction includes a first instruction for PDCCH resources for MBSFN (Multicast Broadcast Single Frequency Network) subframes and a second instruction including a list of indications for PDCCH resources for non-MB SFN subframes; and determining a number of symbols for PDCCH for a MBSFN subframe based on the first instruction and a number of symbols for PDCCH for a non-MBSFN subframe based on the list of indications in the second instruction.

In an implementation, the first instruction includes a single indication of the number of symbols for PDCCH. Under the condition, the processor 410 is used for: determining a same number of symbols for PDCCH for different MBSFN subframes.

In an implementation, the first instruction includes another list of indications of the number of symbols for PDCCH. Under the condition, the processor 410 is used for: determining corresponding indication in the another list of indications based on a relationship between position of the MBSFN subframe and the indication in the another list of indications, and determining the number of symbols for PDCCH for the MBSFN subframe according to the corresponding indication. Herein the position of the MBSFN subframe refers to the position of the MBSFN subframe in a frame, a SFN (system frame number) or a subframe number of the MBSFN subframe. Alternatively, the processor 410 is used for: using the another list of indications in the first instruction in sequence to determine the number of symbols for PDCCH for the MBSFN subframe.

In an implementation, the processor 410 is used for: determining a corresponding indication in the list of indications based on a relationship between the position of the non-MBSFN subframe and the indication in the list of indications in the second instruction, and determining the number of symbols for PDCCH for the non-MBSFN subframe according to the corresponding indication. Herein, the position of the non-MBSFN subframe refers to the location of the non-MBSFN subframe in a frame, a SFN (system frame number), or a subframe number of the non-MBSFN subframe.

In an implementation, the number of indications in the list of indications in the second instruction is same as a period of the MBSFN subframe. Alternatively, the number of indications in the list of indications in the second instruction is not same as a period of the MBSFN subframe.

Figure 5:
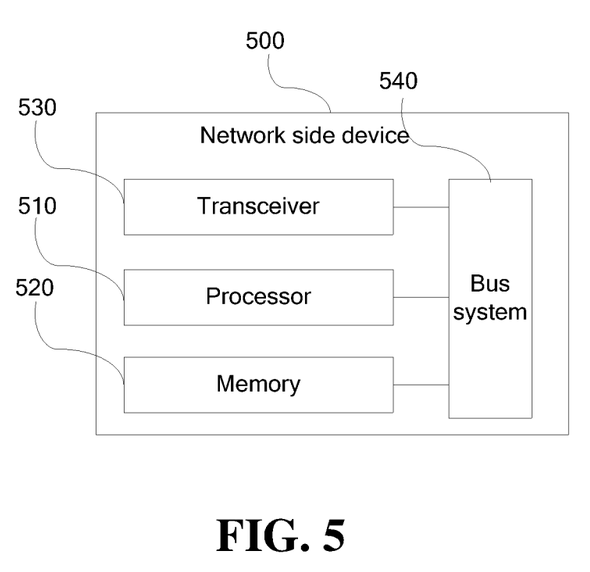
FIG. 5 is a block diagram of the network side device according to yet another implementation of the present disclosure.

FIG. 5 is a network side device according to yet another implementation of the present disclosure. As shown in FIG. 5, the network side device 500 includes a processor 510 and memory 520. Optionally, the network side device 500 may further include a transceiver 530, and a bus system 540. The processor 510, the memory 520 and the transceiver 530 may be connected through the bus system 540. The memory 520 may be used for storing computer programs, and the processor 510 is used for executing the computer programs stored in the memory 520 to control the transceiver 530 to send or receive information. It should be understood that all the actions listed in the method in combination with FIG. 1 and the actions performed by the modules in the network side device 30 recited above in combination with FIG. 3 may be performed by the processor 510 under the indication of programs in the network side device 500, and some detailed descriptions are omitted as appropriate in order to avoid duplication.

Specifically, when the computer programs are performed by the processor 510, the processor 510 is used for generating an instruction for PDCCH (Physical Downlink Control Channel) resources for subframes; wherein the instruction includes a first instruction for PDCCH resources for MBSFN (Multicast Broadcast Single Frequency Network) subframes and a second instruction including a list of indications for PDCCH resources for non-MB SFN subframes; and sending the instruction for PDCCH resources.

In an implementation, the first instruction includes a single indication of the number of symbols for PDCCH. In such a condition, the processor 510 is used for generating the single indication of the number of symbols for PDCCH for MBSFN subframes to indicate that different MBSFN subframes have same number of symbols for PDCCH.

In an implementation, the first instruction includes another list of indications of the number of symbols for PDCCH. In such a condition, the processor 510 is used for sending a relationship between position of the MBSFN subframe and the indication in the another list of indications in the first instruction to a terminal device. Herein the position of the MBSFN subframe refers to the location of the MBSFN subframe in a frame, a SFN (system frame number) or a subframe number of the MBSFN subframe. Alternatively, the processor 510 is used for sending a rule to use the another list of indications in the first instruction in sequence to the terminal device.

In an implementation, the processor 510 is used for sending another rule to use the list of indications in the second instruction in sequence to the terminal device. Alternatively, the processor 510 is used for sending a relationship between position of the non-MBSFN subframe and the indication in the list of indications in the second instruction to the terminal device. Herein, the position of the non-MBSFN subframe refers to the location of the non-MBSFN subframe in a frame, a SFN (system frame number), or a subframe number of the non-MBSFN subframe.

In an implementation, the number of indications in the list of indications in the second instruction is same as a period of the MBSFN subframe. Alternatively, the number of indications in the list of indications in the second instruction is not same as the period of the MBSFN subframe.

Herein, a computer readable medium is provided. The computer readable medium is non-transitory, and is used for storing a computer program which, when being executed by a computer, enables the computer to execute the actions performed by the terminal device for indicating PDCCH resources as shown in FIG. 1 and its all implementations.

Herein, a computer readable medium is provided. The computer readable medium is non-transitory, and is used for storing a computer program which, when being executed by a computer, enables the computer to execute the actions performed by the network side device for indicating PDCCH resources as shown in FIG. 1 and its all implementations.

According to the implementations and possible examples of the present disclosure, the PDCCH resources are indicated by a first instruction for PDCCH resources for MBSFN subframes and a second instruction including a list of indications for PDCCH resources for non-MBSFN subframes. Therefore, the PDCCH resources could be indicated for MBSFN subframes and non-MBSFN subframes separately, and could be indicated flexibly for different non-MBSFN subframes based on the list of indications, so as to meet the requirement on the indication in consideration of both the differentiation between MBSFN and non-MBSFN subframe, and the PDCCH loads for different subframes.

It should be understood that in the above implementations of the present disclosure, the processor may be a central processing unit (CPU), or the processor may be other general purpose processor, digital signal processor (DSP), application specific integrated circuit (ASIC), off-the-shelf programmable gate array (FPGA) or other programmable logic device, discrete gate or transistor logic device, discrete hardware component, etc. The general purpose processor may be a microprocessor or the processor may be any conventional processor or the like.

The memory may include a read only memory and a random access memory, and provide instructions and data to the processor. A portion of the memory may also include a non-volatile random access memory. For example, the memory may also store device type information.

In the process, the actions of the method implementations described above may be accomplished by integrated logic circuits of hardware in the processor or instructions in the form of software. The acts of the method disclosed in connection with the implementation of the present disclosure can be directly embodied by the execution of the hardware processor or by the execution of the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory, and the processor reads the information in the memory and accomplishes the acts of the above method in combination with its hardware. In order to avoid repetition, it will not be described in detail here.

It should be understood that references throughout the specification to "one implementation" or "an implementation" mean that a particular feature, structure, or characteristic related to the implementation is included in at least one implementation of the present disclosure. Therefore, "in one implementation" or "in an implementation" appearing throughout this specification may not necessarily refer to the same implementation. Furthermore, these particular features, structures, or characteristics may be combined in any suitable manner in one or more implementations.

It should be understood that in various implementations of the present disclosure, the values of the sequence numbers in the above-mentioned processes do not indicate the order of execution, and the order of execution of various processes should be determined by its function and internal logic, and should not constitute any limitation on the process of the implementations of the present disclosure.

Those of ordinary skill in the art will recognize that the method steps and units described in connection with the implementations disclosed herein can be implemented in electronic hardware, computer software, or a combination of the two. In order to clearly illustrate the interchangeability of hardware and software, the acts and components of the implementations have been described in a functional general manner in the above description. Whether these functions are implemented in hardware or software depends on the specific application and design constraints of the technical solution. One skilled in the art may use different methods to implement the described functions for each particular application, but such implementation should not be considered to be beyond the scope of the present disclosure.

The methods or steps described in connection with the implementations disclosed herein may be implemented in hardware, a software program executable by a processor, or a combination of the hardware and the soft program executable by the processor. The software program may be placed in a random access memory (RAM), a memory, a read-only memory (ROM), an electrically programmable read-only memory (EPROM), an electrically erasable programmable read-only memory (EEPROM), a register, a hard disk, a removable disk, a compact disc read-only memory (CD-ROM), or any other form of storage medium known in the art.

In several implementations provided by the present disclosure, it should be understood that the disclosed systems, devices and methods may be implemented in other ways. For example, the device implementations described above are only illustrative, for example, the division of the units is only a logical function division, and there may be other division manners in actual implementation, for example, multiple units or components may be combined or integrated into another system, or some features may be ignored or not executed.

The unit described as a separate unit may or may not be physically separated, and the component shown as a unit may or may not be a physical unit, i.e., it may be located in one place or may be distributed over multiple network units. Some or all of the units can be selected according to actual needs to achieve the purpose of the implementations.

In addition, various functional units in various implementations of the present disclosure may be integrated in one processing unit, or the units may be physically present separately, or two or more units may be integrated in one unit.

Although the present disclosure has been described in detail with reference to the accompanying drawings and in connection with preferred implementations, the present disclosure is not limited thereto. Those skilled in the art may make various equivalent modifications or substitutions to the implementations of the present disclosure without departing from the spirit and essence of the present disclosure, and such modifications or substitutions are intended to be within the scope of the present disclosure.

What is claimed is:

1. A method for indicating PDCCH resources, comprising:
   receiving, by a terminal device, an instruction for Physical Downlink Control Channel (PDCCH) resources for subframes; wherein the instruction comprises a first instruction for PDCCH resources for Multicast Broadcast Single Frequency Network (MBSFN) subframes and a second instruction comprising a list of indications for PDCCH resources for non-MBSFN subframes; and
   determining, by the terminal device, a number of symbols for PDCCH for a MBSFN subframe based on the first instruction and a number of symbols for PDCCH for a non-MBSFN subframe based on the list of indications in the second instruction; wherein the first instruction comprises a single indication of the number of symbols for PDCCH;
   wherein determining the number of symbols for PDCCH for the non-MBSFN subframe based on the list of indications in the second instruction comprises:
   using the list of indications in the second instruction sequentially and periodically to determine the number of symbols for PDCCH for the non-MBSFN subframe.

2. The method according to claim 1, wherein different MBSFN subframes have a same number of symbols for PDCCH.

3. The method according to claim 1, wherein a number of indications in the list of indications in the second instruction is not same as the period of the MBSFN subframe.

4. A terminal device, comprising: a processor and a transceiver, wherein
   the transceiver is configured to receive an instruction for Physical Downlink Control Channel (PDCCH) resources for subframes; wherein the instruction comprises a first instruction for PDCCH resources for Multicast Broadcast Single Frequency Network (MBSFN) subframes and a second instruction comprising a list of indications for PDCCH resources for non-MBSFN subframes;
   the processor is configured to determine a number of symbols for PDCCH for a MBSFN subframe based on the first instruction and a number of symbols for PDCCH for a non-MBSFN subframe based on the list of indications in the second instruction; and the first instruction comprises a single indication of the number of symbols for PDCCH;

wherein the processor is configured to use the list of indications in the second instruction sequentially and periodically to determine the number of symbols for PDCCH for the non-MBSFN subframe.

5. The terminal device according to claim 4, wherein different MBSFN subframes have a same number of symbols for PDCCH.

6. The terminal device according to claim 4, wherein a number of indications in the list of indications in the second instruction is not same as a period of the MBSFN subframe.

7. A method for indicating PDCCH resources, comprising:

generating, by a network side device, an instruction for Physical Downlink Control Channel (PDCCH) resources for subframes; wherein the instruction comprises a first instruction for PDCCH resources for Multicast Broadcast Single Frequency Network (MBSFN) subframes and a second instruction comprising a list of indications for PDCCH resources for non-MBSFN subframes; and sending, by the network side device, the instruction for PDCCH resources to a terminal device; wherein the first instruction comprises a single indication of the number of symbols for PDCCH;

wherein the method further comprises:

sending, by the network side device, a rule to use the list of indications in the second instruction sequentially and periodically to the terminal device.

8. The method according to claim 7, wherein different MBSFN subframes have a same number of symbols for PDCCH.

9. The method according to claim 7, wherein a number of indications in the list of indications in the second instruction is not same as the period of the MBSFN subframe.

10. A network side device, comprising: a processor and a transceiver, wherein the processor is configured to generate an instruction for Physical Downlink Control Channel (PDCCH) resources for subframes; wherein the instruction comprises a first instruction for PDCCH resources for Multicast Broadcast Single Frequency Network (MBSFN) subframes and a second instruction comprising a list of indications for PDCCH resources for non-MBSFN subframes;

the transceiver is configured to send the instruction for PDCCH resources to a terminal device; and the first instruction comprises a single indication of the number of symbols for PDCCH;

wherein the transceiver is configured to send a rule to use the list of indications in the second instruction sequentially and periodically to the terminal device.

11. The network side device according to claim 10, wherein different MBSFN subframes have a same number of symbols for PDCCH.

12. The network side device according to claim 10, wherein a number of indications in the list of indications in the second instruction is not same as the period of the MBSFN subframe.

* * * * *